United States Patent Office 3,320,714
Patented May 23, 1967

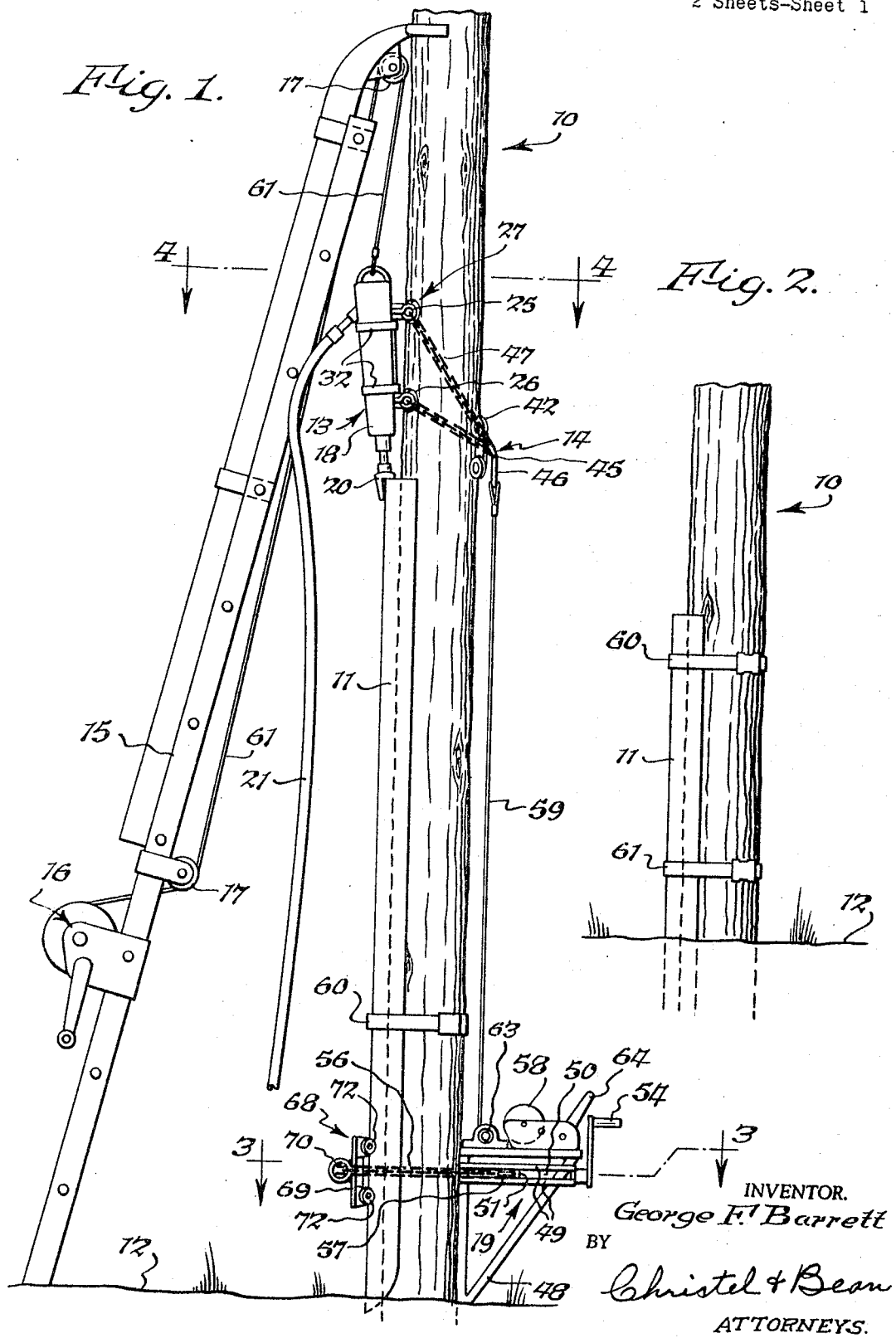

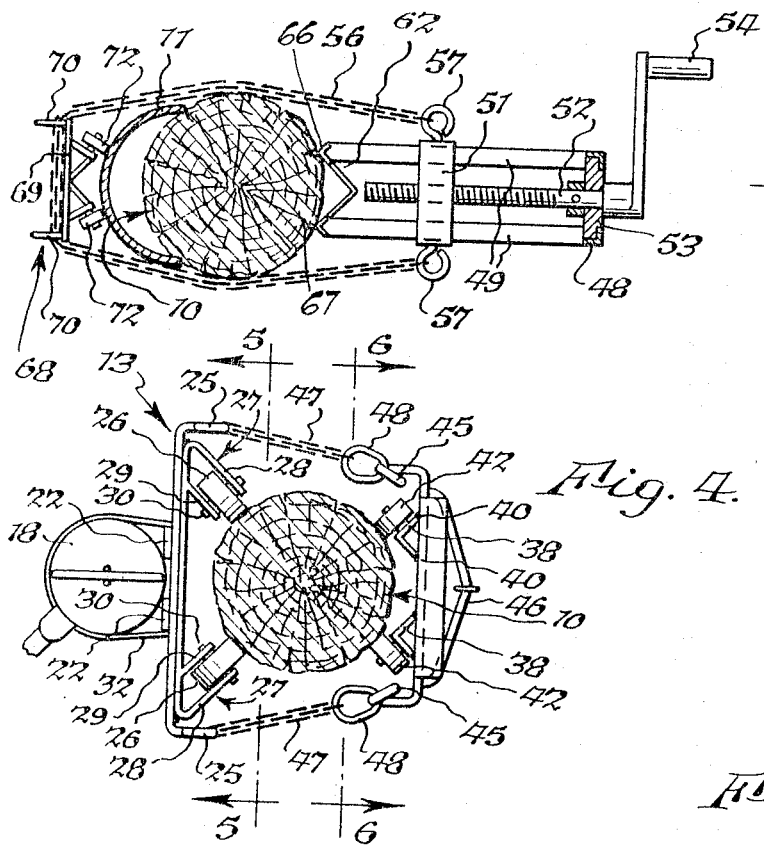
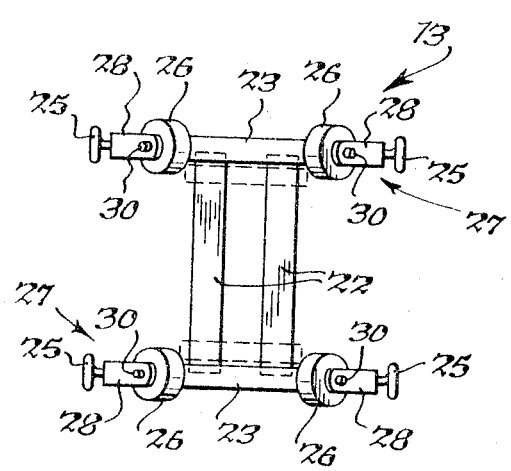
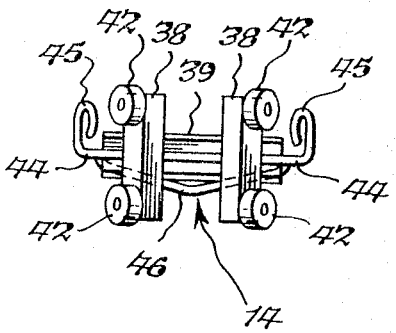

3,320,714
METHOD OF AND APPARATUS FOR POLE REINFORCING
George F. Barrett, Littleton, Colo., assignor to The Kamphausen Company, Englewood, Colo.
Filed June 10, 1966, Ser. No. 556,737
10 Claims. (Cl. 52—742)

This invention relates to a method of and apparatus for reinforcing poles and in particular to the reinforcement of decayed or otherwise weakened wooden utility poles.

Wooden utility poles decay at the groundline and become so weakened under varying climatic conditions as to be unable to bear their designed load. Replacement of such poles is costly and oftentimes disrupts the service afforded by the poles. To extend their useful life, reinforcing sleeves are driven into the ground and secured to the base of the poles. However, installation of a reinforcing sleeve against a pole poses problems in applying sufficient force to drive the sleeve into the ground at the base of the pole and in maintaining a driving head against the sleeve during downward movement thereof since the sleeve must be positioned closely about the pole. Also, vibration of the pole, when driving the sleeve into the ground, must be avoided since otherwise the wires carried by the poles will vibrate dangerously and may work loose.

Moreover, sleeve installation has, heretofore, required heavy, cumbersome, and costly equipment which often is not adapted for use in inaccessible or restricted areas.

Accordingly, it is a primary object of the present invention to provide apparatus for installing a pole reinforcer, adjacent the base of the pole which is compact, readily portable, inexpensive and easily applied to the pole without affecting or interrupting the intended purpose of the pole.

It is also a primary object of this invention to provide a method of reinforcing a pole which is easily performed in a minimum of time, requires a minimum number of operators and provides a wide margin of safety when used.

In one aspect thereof the apparatus of this invention is characterized by the provision of a carrier unit having a carriage, a pair of wheels mounted on the carriage in laterally spaced relation and mounted for rotation about inclined axes whereby the carriage is adapted for rolling movement along the external cylindrical surface of a pole, a trailer, a pair of wheels mounted thereon in laterally spaced relation for rotation about inclined axes wherein the trailer is adapted for rolling movement along the external cylindrical surface of the pole on the side thereof opposite the carriage, releasable means connecting the carriage and trailer for movement along the pole as a unit, and connecting means carried by the carrier unit and adapted for connection with means for moving the carrier unit along the pole in either direction.

In another aspect thereof, the method of this invention is characterized by the steps of positioning an elongated reinforcing member against the pole, positioning a driving element in abutting relation against the top of the reinforcing member, actuating the driving element to drive the reinforcing member downwardly, maintaining the driving element in abutting relation against the top of the reinforcing member during downward movement thereof, and securing the reinforcing member to the pole.

Various other novel features and advantages inherent in the pole reinforcing method and apparatus of the present invention are pointed out in detail in conjunction with the following description of a typical embodiment thereof considered in conjunction with the accompanying drawings wherein like numerals represent like parts throughout the various views and wherein:

FIG. 1 is a fragmentary side elevational view of a pole with a pole reinforcing apparatus of the present invention positioned for use therewith;

FIG. 2 is a fragmentary side elevational view of a pole reinforced by the apparatus and according to the method of the present invention;

FIG. 3 is a horizontal sectional view of a portion of the pole reinforcing apparatus taken about on line 3—3 of FIG. 1;

FIG. 4 is a horizontal sectional view of another portion thereof taken about on line 4—4 of FIG. 1;

FIG. 5 is an elevational view of the underside of the carriage taken about on line 5—5 of FIG. 4 with portions omitted for ease of illustration; and FIG. 6 is an elevational view of the underside of the trailer taken about on line 6—6 of FIG. 4 with portions omitted for clarity.

Referring now to the drawings and in particular to FIG. 1, there is shown a pole, designated 10, of a type generally referred to as a wooden utility pole together with the general arrangement of elements adapted, in accordance with the present invention, to drive a steel reinforcing sleeve 11 into the ground 12 in reinforcing position relative to pole 10. Such elements include an air hammer carrier unit comprising a carriage and a trailer, generally designated 13 and 14 respectively, mounted for rolling movement along pole 10, an extension ladder 15 having a winch 16 and pulleys 17 arranged to hoist an air hammer 18 carried by carriage 13, and an anchor stand generally designated 19 for maintaining the driving head 20 of air hammer 18 in abutting relation against the top of reinforcing sleeve 11.

Referring now in detail to FIGS. 4 and 5, there is shown a typical embodiment of the carriage which comprises a pair of laterally spaced support bars 22 having cross bars 23 secured at opposite ends thereof by welding or the like. A rod 24 is secured along the outside face of each cross bar 23 and extends laterally beyond the outer extremities thereof to form eyes 25 at its opposite ends.

A pair of wheels 26 is mounted on the inward face of each cross bar 23 adjacent the outer ends thereof and each wheel is canted inwardly by clevis type axle mountings designated 27. Each mounting 27 comprises an inwardly turned end 28 of cross bar 23 and a laterally inwardly spaced bracket 29 secured to the inner face of cross bar 23. Ends 28 and brackets 29 form identical acute angles with the inner faces of cross bars 23 and have axles 30 passing through end portions thereof, thereby mounting wheels 26 for rolling engagement on the exterior cylindrical surface of pole 10 with the planes of rotation thereof substantially normal to such surface.

Air hammer 18 abuts the external adjacent edges of spaced support bars 22 and is secured thereagainst by a pair of straps 32 engaging around the air hammer and behind bars 22 as best seen in FIGS. 1 and 4. Air hammer 18 is of conventional design having a clevis shaped driving head 20 and an air hose 21.

Trailer 14, as best seen in FIGS. 4 and 6, comprises a pair of outwardly opening and laterally spaced angle irons 38 connected by an inwardly opening angle iron cross frame 39 with the outer edges of irons 38 secured to the inner edges of frame 39, by welding or the like, at 40. A pair of wheels 42 is provided on the outer lateral faces of each angle iron 38 adjacent the ends thereof. Wheels 42 are thus canted inwardly similarly to wheels 26 of carriage 13 to provide a trailer adapted to roll on the exterior cylindrical surface of pole 10 with the planes of rotation of wheels 42 substantially normal to the cylindrical surface.

A connecting rod 44 extends through the lateral opening formed by angle iron 39 and the outer edges of irons 38 and is freely pivotable therein. Rod 44 has eyes 45 formed on its opposite ends and carries a V-shaped hook 46, the opposite ends of which are secured to rod 44 on opposite sides of cross frame 39 for pivotal movement with rod 44.

A pair of chain loops 47 are provided and connect trailer 14 with carriage 13 on opposite sides of the pole. An end of each loop is secured to an eye 25 on one side of carriage 13 with the other end thereof passing through an eyelet 48 carried by an eye 45 of trailer 14 on a corresponding side of pole 10 and secured to the other eye 25 on the same side of the carriage. Loops 47 are sufficiently long as to loosely connect the carriage and trailer. In this manner, the hammer carrying carriage 13 and the trailer 14 are mounted for rolling movement along the pole 10 on opposite sides thereof and may encompass both pole 10 and sleeve 11 due to the slack in loops 47.

Anchor stand 19, as best seen in FIGS. 1 and 3, comprises a pair of spaced triangular frames 48 suitably secured together an dhaving a pair of horizontal guide bars 49 in each frame providing a pair of laterally spaced slots 50 slidably receiving opposite ends of a slide bar 51. A screwjack 52 is rotatably secured against axial movement between frames 48 in bracket 53 and threads through bar 51, whereby rotation of handle 54 in opposite directions moves bar 51 toward and away from pole 10. A binder chain 56 is provided for looping through a dolly generally designated 68, described hereinafter, and about pole 10 and sleeve 11 with opposite ends thereof connecting with eyelets 57 on respective opposite ends of bar 51. The pole abutting side of stand 19 has a pair of V-shaped vertically spaced cross brackets 62 connecting opposite vertically extending members 66 of frames 48, the members 66 having vertically spaced laterally projecting nubs 67 for engaging against the surface of pole 10. A pull-down winch 58 is mounted on stand 19 and has a line 59 engaging about a pulley 63 for connection with V-hook 46. A crank handle 64 is provided and, through a suitable gearing arrangement, is operable to rotate winch 58 to tension line 59.

Dolly 68 comprises a main frame 69 mounting eye loops 70 at opposite sides of the dolly, and mounting a pair of laterally spaced angle wheel brackets 71 by welding or the like. A pair of wheels 72 are mounted at opposite ends of angle brackets 71 on the outer faces thereof for rolling engagement against reinforcing member 11 in planes of rotation normal to the surface thereof.

In use, sleeve 11 is positioned against pole 10 and held thereagainst loosely by a strap 60. Stand 19 is positioned against the base of pole 10 with nubs 67 engaging thereagainst. Chain 56 is looped about sleeve 11 and pole 10 and through eye loops 70 of dolly 68 which is positioned in rolling engagement against sleeve 11 opposite from stand 19 with opposite ends of chain 56 secured to bar 51. Screwjack 52 is turned and bar 51 moves outwardly to tighten binder chain 52 whereby dolly 68 is drawn taut against reinforcing member 11 to thereby firmly anchor stand 19 to the base of pole 10 yet allow reinforcing member 11 to be driven downwardly without frictional contact with binder chain 56.

Extension ladder 15 is placed in hoisting position against pole 10 on the same side thereof as sleeve 11, with upper pulley 17 spaced above sleeve 11. A hoist line 61 is secured to the top of air hammer 18 by any suitable arrangement, and the latter, together with carriage 13, is hoisted by winch 16 to a position above stand 19. Trailer 14 is then positioned against the opposite side of pole 10 from carriage 13 so that the wheels of carriage 13 and trailer 14 bear against sleeve 11 and pole 10 respectively. Chain loops 47 are passed through eyelets 48 of trailer 14 and are connected with the associated eyes 25 of carriage 13 to secure carriage 13 and trailer 14 together with pole 10 and sleeve 11 therebetween. Winch line 59 is connected to hook 46 and pull-down winch 58 is released to allow winch 16 to hoist the hammer and carrier unit 13, 14 and roll the same upwardly along sleeve 11 and pole 10.

Hammer 18 then is placed in driving position relative to sleeve 11 by dropping the clevis shaped driving head 20 of hammer 18 over the upper end of sleeve 11. Line 59 is then tightened by winch 58 to draw trailer 14 downwardly, causing both carriage 13 and trailer 14 to bear tightly against pole 10. Hoist line 61 is then relieved but maintained taut as a safety measure and the apparatus is now in position to drive sleeve 11 into the ground.

Air hammer 18 is then actuated via air hose 21, and winch line 59 is continuously tensioned by pull-down winch 58 during downward movement of the hammer and carrier unit to maintain hammer head 20 against the top of sleeve 11 as hammer 18 drives the sleeve into the ground, as shown in FIG. 1. Sleeve 11 is driven into the ground to the desired depth with an upper portion thereof left exposed above the ground. Hoist line 61 is then locked, to carry the weight of the hammer and carrier unit, and line 59 is released to permit disconnection of the hammer carriage and trailer and removal thereof from the pole and sleeve. Screwjack 52 of stand 19 is rotated to slacken binder chain 56 which is then removed from engagement about the pole and sleeve and through dolly 68 to thereby release dolly 68 and stand 19 from their anchored position.

To secure reinforcing sleeve 11 to the pole 10, strap 60 is tensioned about the pole and sleeve by a tensioning apparatus similar to that disclosed in U.S. Patent No. 3,193,252 dated July 6, 1965. A second strap 61, vertically spaced from strap 60, is similarly applied and tensioned. Sleeve 11 is thus secured in reinforcing relation against pole 10 and in a manner which fully accomplishes the objects of this invention.

Having thus described and illustrated a preferred embodiment of the invention, it will be understood that such modifications and changes as may suggest themselves to those skilled in the art are intended to fall within the scope of the appended claim.

What I claim as new is:

1. The method of reinforcing poles by driving a reinforcing member into the ground adjacent the base of the pole comprising the steps of positioning an elongated reinforcing member against a pole adjacent the base thereof, mounting a driving element on the pole for movement therealong, positioning the driving element in driving relation to the upper end portion of the reinforcing member, actuating the driving element to drive the reinforcing member downwardly, maintaining the driving element in driving relation to the upper end portion of the reinforcing member during downward movement of the latter, exerting a continual force on the driving element for moving it downwardly along the pole in following relation to the reinforcing member, and securing the reinforcing member to the pole in reinforcing relation thereto.

2. The method of reinforcing poles according to claim 1 wherein the step of positioning the driving element includes securing the driving element to the pole in movable relation thereto and then raising the driving element upwardly along the pole.

3. The method of reinforcing poles according to claim 1 wherein the step of positioning the reinforcing member against the pole includes loosely fastening the reinforcing member to the pole for relative sliding movement therealong, wherein the driving element is mounted on a carriage and the step of positioning the driving element includes positioning a hoisting means above the reinforcing member, positioning the carriage against the pole, positioning a trailer against the pole on the side thereof opposite from the carriage, connecting the carriage and trailer for unitary movement along the pole, connecting the hoisting means with the driving element, rolling the carriage and trailer with the driving element secured thereto upwardly along the pole by actuating the hoist means, and placing the head of the driving element in driving relation to the upper end portion of the reinforcing member, and wherein the steps of maintaining the driving relation between the driving element and the reinforcing member and exerting a continual force on the driving member include securing an anchor to the base of the pole, connecting a line between the anchor and the trailer, continuously tensioning the line as the driving element drives the reinforcing member into the ground.

4. The method of reinforcing poles by driving a reinforcing member into the ground adjacent the base of the pole comprising the steps of positioning an elongated reinforcing member against a pole adjacent the base thereof, positioning a driving element in driving relation to the upper end portion of the reinforcing member, actuating the driving element to drive the reinforcing member downwardly, maintaining the driving element in driving relation to the upper end portion of the reinforcing member during downward movement of the latter, said last-mentioned step including providing an anchor adjacent the base of the pole and continuously tensioning a connecting line between the driving element and the anchor as the driving element drives the reinforcing member into the ground, and securing the reinforcing member to the pole in reinforcing relation thereto.

5. The method of reinforcing poles by driving a reinforcing member into the ground adjacent the base of the pole comprising the steps of positioning an elongated reinforcing member against a pole adjacent the base thereof, positioning a driving element in driving relation to the upper end portion of the reinforcing member, actuating the driving element to drive the reinforcing member downwardly, maintaining the driving element in driving relation to the upper end portion of the reinforcing member during downward movement of the latter, wherein the driving element is mounted on a carriage and the step of positioning the driving element includes positioning the carriage against the pole, positioning a trailer against the pole on the side thereof opposite from the carriage, connecting the carriage and trailer for unitary movement along the pole and raising the carriage and trailer along the pole, and securing the reinforcing member to the pole in reinforcing relation thereto.

6. A carrier unit for use with apparatus for driving a reinforcing member into the ground adjacent a pole to reinforce the same and adapted for movement along the pole, said carrier unit comprising a carriage, wheel means carried by said carriage, a trailer, wheel means carried by said trailer, said carriage and trailer wheel means being adapted to roll along the external cylindrical surface of the pole on opposite sides thereof, releasable means for securing said carriage and said trailer on opposite sides of the pole for rolling movement along the pole, a driving element secured to said carriage, and means carried by said carrier unit and adapted for connection with a tensioning means for rolling said carrier unit along the pole in opposite directions, wherein said releasable means comprise flexible members loosely connecting the carriage and the trailer for positioning said trailer in downwardly offset relation to said carriage.

7. A carrier unit according to claim 6 wherein said wheel means comprise laterally spaced wheels carried by said trailer and said carriage, and means mounting said wheels for rotation about inclined axes and in planes substantially normal to the external cylindrical surface of the pole.

8. A carrier unit as set forth in claim 6, wherein said driving element is downwardly and inwardly inclined relative to the pole.

9. A carrier unit as set forth in claim 6, together with tensioning means comprising anchor means adapted to be positioned adjacent the base of a pole, a line connected to said carrier unit connection means, and means for tensioning said line between said carrier unit and said anchor means.

10. A carrier unit for use with apparatus for driving a reinforcing member into the ground adjacent a pole to reinforce the same and adapted for movement along the pole between spaced tensioning means, said carrier unit comprising a carriage, a pair of laterally spaced wheels carried by said carriage, a trailer, a pair of laterally spaced wheels carried by said trailer, said latter wheels being adapted to roll along the external cylindrical surface of the pole on the side thereof opposite said carriage, releasable means for securing said carriage and said trailer on opposite sides of the pole for rolling movement along the pole, and means carried by said carrier unit and adapted for connection with a tensioning means for rolling said carrier unit along the pole in opposite directions, together with a pair of tensioning means, one of said tensioning means comprising an anchor stand adapted to be positioned adjacent the base of a pole, a winch mounted on said stand, and a line carried by said winch connecting with said carrier unit connection means for urging said carrier unit downwardly along the pole, the other of said tensioning means including a hoist winch, an elevated pulley, and a line carried by said winch and about said pulley and connecting with said connection means for lifting said carrier unit along the pole.

References Cited by the Examiner

UNITED STATES PATENTS

| | | | |
|---|---|---|---|
| 2,654,638 | 10/1953 | Elliott | 182—133 |
| 3,033,297 | 5/1962 | Hall | 173—31 X |
| 3,193,252 | 7/1965 | Barrett | 52—170 X |

FOREIGN PATENTS

| | | |
|---|---|---|
| 537,424 | 11/1931 | Germany. |
| 829,107 | 1/1952 | Germany. |

FRANK L. ABBOTT, *Primary Examiner.*

M. O. WARNECKE, *Assistant Examiner.*